Dec. 23, 1958  A. HALTMEIER  2,865,619
APPARATUS FOR SCRUBBING GASES
Filed Oct. 25, 1955
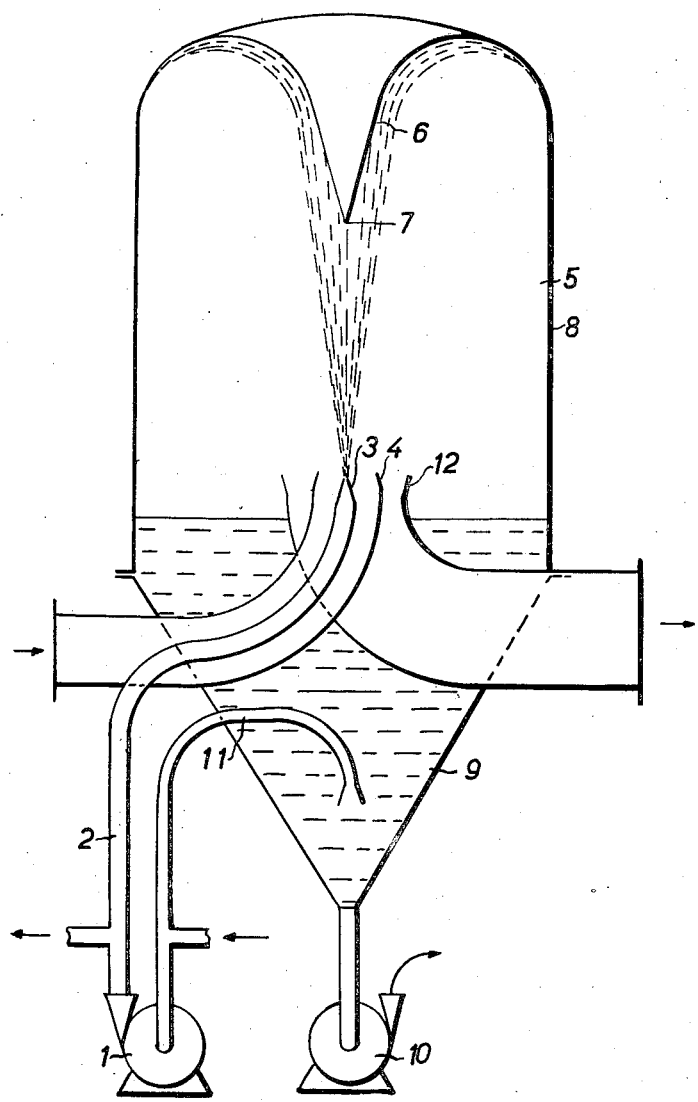
INVENTOR.
ALFRED HALTMEIER
BY
ATTORNEYs

United States Patent Office 2,865,619
Patented Dec. 23, 1958

2,865,619
APPARATUS FOR SCRUBBING GASES

Alfred Haltmeier, Leverkusen, Germany, assignor to Farbenfabriken Bayer Aktiengesellschaft, Leverkusen, Germany, a corporation of Germany Application October 25, 1955, Serial No. 542,611

Claims priority, application Germany November 9, 1954

3 Claims. (Cl. 261—116)

This invention relates to an apparatus for scrubbing gases.

It is known to scrub gases in a scrubbing tower in which the scrubbing liquid is sprayed upwardly in a free jet and then runs down the wall of the tower. The advantages of this construction are, inter alia, a small drop in pressure of the gases to be scrubbed, prevention of the deposition of solids on the trickling surfaces and the small area required. Difficulties arise, however, in passing the gases through the scrubbing tower, since it is necessary as far as possible to avoid using partitions on which disturbing deposition may occur. If it is permissible for the gases to be passed in only one direction, i. e. if they can enter at the lower end, for example, and discharge into the atmosphere at the upper end, it is possible to use a deflecting surface for the upwardly sprayed liquid, deposition on the said surface not occurring, owing to the high flow velocity of the liquid.

Generally speaking, however, it is desired to remove the scrubbed gases at the lower end of the scrubbing tower in order that they may thereafter be further utilised. Since the gas is also fed into the lower portion of the scrubbing tower there is the danger that the gases leave the tower without having been in contact with the scrubbing liquid over a sufficiently long distance.

The present invention provides an apparatus for scrubbing gases in a scrubbing tower which is closed at its upper end, wherein both the scrubbing liquid and the gas to be scrubbed ascend in the tower owing to kinetic energy imparted thereto, are deflected in a downward direction and flow down the walls of the tower. If the scrubbing liquid is fed in from one or more openings in the lower part of the scrubbing tower and then forced upwards, it is soon split up into separate droplets, and these droplets entrain the gases ascending parallel thereto. Both components of the gas liquid mixture are deflected through 180° by the deflecting hood of the scrubbing tower and thereafter flow parallel to one another down the walls of the tower.

Apparatus suitable for carrying out this scrubbing method consists of a scrubbing tower which is closed at the upper end and equipped with supply and discharge pipes for the scrubbing liquid and gas at the lower end of the scrubbing chamber, the supply pipes for both media having upwardly directed discharge openings. Suitably shaped deflecting surfaces, preferably with a downwardly directed central point, are preferably arranged at the upper end of the scrubbing chamber. The supply pipe for the scrubbing liquid is preferably arranged inside the supply pipe for the gas to be scrubbed, which latter pipe can in turn be surrounded by the discharge pipe for the scrubbed gas. The said pipes can, for example, be arranged concentrically of one another.

The invention will now be illustrated by reference to the single figure of the accompanying drawings, which diagrammatically illustrates one embodiment of the apparatus of the invention. By means of kinetic energy supplied by a pump 1, the scrubbing liquid is fed through a pipe 2 to a nozzle 3, from which it issues in a free jet. As its distance from the nozzle 3 increases, the jet of ascending scrubbing liquid spreads out and splits up more and more into separate droplets. The jet of scrubbing liquid is surrounded and penetrated by a jet of the gases which are to be scrubbed, these gases also entering at the lower end of the scrubbing chamber through a supply pipe 4 which concentrically surrounds the liquid supply pipe. The jet of mixture consisting of liquid and gas ascends in the scrubbing chamber 5 and is deflected by 180° by deflecting surfaces 6 which are arranged at the upper end of the scrubbing chamber and which preferably merge into a central downwardly directed point 7. The maximum scrubbing effect is thus obtained. The liquid and gase then flow down the walls 8 of the tower. The liquid collects in the liquid sump 9, which is preferably of conical form, as shown here, while the scrubbed gases are discharged through a gas discharge pipe 12 in order to be aftertreated, for example in a second identical scrubber. The gas discharge pipe 12 can for example concentrically surround the gas supply pipe 4. Any solids in the liquid sump 9 sink to the bottom thereof and can if desired be removed by means of a sludge pump 10.

The pump 1 also extracts scrubbing liquid from the liquid sump through its intake pipe 11, and this liquid is sprayed upwardly into the scrubbing chamber 5 in the manner already described.

I claim:

1. Apparatus for scrubbing gases with liquid which comprises a substantially vertically extending scrubbing tower, upwardly directed liquid jet nozzle means centrally positioned in the lower portion of said tower and dimensioned for passing a narrow diverging jet of liquid upwardly through said tower, upwardly directing gas jet nozzle means in the lower portion of said tower concentrically surrounding said liquid jet nozzle means terminating substantially at the same height in the tower thereas, dimensioned and positioned for passing a narrow diverging jet of gas upwardly through said tower in contact with a diverging jet of liquid from said liquid jet nozzle over substantially the entire upward path of travel thereof, deflecting means positioned in the upper portion of said tower and dimensioned to deflect and reverse both said jets and direct the same downwardly along the inner surface of the wall of said tower, means for supplying a scrubbing liquid to said liquid jet nozzle means, means for supplying gas to be scrubbed to said gas jet nozzle means, a gas outlet conduit concentrically surrounding said gas jet nozzle means, and liquid discharge means positioned in the lower portion of said tower.

2. Apparatus according to claim 1, in which said deflecting means comprises an inwardly arched surface closing the upper portion of said tower and having a centrally positioned downwardly directed conically shaped portion.

3. Apparatus, according to claim 1, including a liquid reservoir defined in the lower portion of said tower and means for recirculating liquid from said liquid reservoir to said liquid jet nozzle.

References Cited in the file of this patent

UNITED STATES PATENTS 2,088,691    Dill _____ Aug. 3, 1937

FOREIGN PATENTS 700,336    Great Britain _____ Nov. 25, 1953